United States Patent
Im et al.

(10) Patent No.: US 7,711,450 B2
(45) Date of Patent: May 4, 2010

(54) APPARATUS AND METHOD FOR CONTROLLING CAMERA OF ROBOT CLEANER

(75) Inventors: Hyoung-deuk Im, Seoul (KR); Il-kyun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 708 days.

(21) Appl. No.: 11/553,289

(22) Filed: Oct. 26, 2006

(65) Prior Publication Data

US 2007/0100501 A1  May 3, 2007

(30) Foreign Application Priority Data

Oct. 27, 2005  (KR)  ........................ 10-2005-0101804

(51) Int. Cl.
*G05B 15/00* (2006.01)

(52) U.S. Cl. .......................... 700/259; 901/44; 901/46; 901/47; 396/5; 396/419; 396/424; 396/428; 396/429

(58) Field of Classification Search ................. 700/259, 700/245
See application file for complete search history.

(56) References Cited

U.S. PATENT DOCUMENTS

| | | | |
|---|---|---|---|
| 4,855,822 A | | 8/1989 | Narendra et al. |
| 6,604,868 B2 * | | 8/2003 | Hsieh .......................... 396/419 |
| 6,927,905 B1 * | | 8/2005 | Kashitani et al. ............ 359/402 |
| 2002/0091466 A1 * | | 7/2002 | Song et al. ................... 700/245 |
| 2002/0153184 A1 | | 10/2002 | Song et al. |
| 2002/0153185 A1 | | 10/2002 | Song et al. |
| 2003/0077082 A1 * | | 4/2003 | Ito .............................. 396/428 |
| 2004/0201772 A1 * | | 10/2004 | Kobayashi ................... 348/372 |
| 2005/0035991 A1 * | | 2/2005 | Fredrickson ................. 347/33 |
| 2005/0222710 A1 * | | 10/2005 | Schell et al. ................. 700/245 |
| 2006/0083509 A1 * | | 4/2006 | Shimo ......................... 396/268 |
| 2006/0115263 A1 * | | 6/2006 | DiRisio et al. .............. 396/388 |

FOREIGN PATENT DOCUMENTS

| | | |
|---|---|---|
| CN | 1280312 A | 1/2001 |
| CN | 1401292 A | 3/2003 |
| KR | 10-2000 0002483 | 1/2000 |
| KR | 10-2002 0038296 | 5/2002 |

OTHER PUBLICATIONS

U.S. Appl. No. 11/553,224 to Kim et al., which was filed on Oct. 26, 2006.

(Continued)

*Primary Examiner*—Khoi Tran
*Assistant Examiner*—Rodney King
(74) *Attorney, Agent, or Firm*—Birch, Stewart, Kolasch & Birch, LLP

(57) ABSTRACT

Disclosed are an apparatus and a method for controlling a camera mounted at a robot cleaner in order to sense obstacles and perform position compensation. The apparatus for controlling a camera of a robot cleaner includes a first axis driver for driving a camera mounted at the robot cleaner in a first axis direction; a second axis driver 320 for driving the camera in a second axis direction other than the first axis direction; an image processor 330 for receiving and processing an image photographed by the camera; and a control section 340 for controlling the first axis driver and the second axis driver, and controlling a traveling of the robot cleaner based on the image photographed by the camera.

9 Claims, 5 Drawing Sheets

OTHER PUBLICATIONS

U.S. Appl. No. 11/553,533 to Im et al., which was filed on Oct. 27, 2006.
English language abstract of KR 10-2000-0002483.
English language abstract of KR 10-2002-0038296.
English language Abstract of CN 1401292 A.
English language Abstract of CN 1280312 A.

* cited by examiner

APPARATUS AND METHOD FOR CONTROLLING CAMERA OF ROBOT CLEANER

CROSS-REFERENCE TO RELATED APPLICATIONS

This application claims benefit under 35 U.S.C. §119 from Korean Patent Application No. 2005-0101804, filed on Oct. 27, 2005, the entire content of which is incorporated herein by reference.

BACKGROUND OF THE INVENTION

1. Field of the Invention

The present invention relates to an apparatus and a method for controlling a camera mounted at a robot cleaner in order to sense obstacles and perform a position compensation, and more particularly, to an apparatus and a method for controlling a camera of a robot cleaner, which photograph a subject to sense obstacles and to photograph a label for a position compensation by moving and controlling one camera mounted at a robot cleaner in two axis directions.

2. Description of the Related Art

A conventional robot cleaner may sense cleaning zones or obstacles using a camera. Korean patent application No. 1998-23269 discloses a technique, which rotates a camera and a laser beam discharge element at a predetermined angle to photograph an ambient environment of a cleaning zone in which a laser beam point is formed and to detect a pattern of the cleaning zone according to the photographed image. Further, Korean patent application No. 2000-68446 discloses a technique for sensing obstacles, which includes a vision camera for emitting a laser to obstacles and detecting a linear beam reflected from the obstacles.

On the other hand, a technique confirming a position of a robot cleaner using a camera while the robot cleaner cleans while moving to a predetermined zone is known. FIG. 1 is a perspective view for schematically showing a conventional robot cleaner with a camera for position compensation. A front camera 110 is installed in front of the robot cleaner. The front camera 110 senses whether or not there are obstacles. That is, the front camera 110 photographs a front of the robot cleaner to sense obstacles. On the other hand, an upper camera 120 confirms or compensates a position of the robot cleaner. More particularly, the upper camera 120 photographs a predetermined label installed at a ceiling or a wall of an indoor, and confirms or estimates the position of the robot cleaner based on the photographed label.

However, the conventional robot cleaner should separately include a camera for sensing obstacles and a camera for confirming a position thereof. That will make a construction of the robot cleaner complicated. Further, a use of a plurality of camera modules boosts manufacturing cost of the robot cleaner.

SUMMARY OF THE INVENTION

Accordingly, it is an object of the present invention to provide an apparatus and a method for controlling a camera of a robot cleaner, which embody a function of sensing obstacles and a function of confirming and compensating a position of a robot cleaner with one camera mounted at the robot cleaner by moving the one camera in two different axis directions to photograph an image.

Another object of the present invention is to provide an apparatus and a method for controlling a camera of a robot cleaner, which may sense objects existing at different directions by rotating the camera in horizontal and vertical directions.

A further object of the present invention is to provide an apparatus and a method for controlling a camera of a robot cleaner, which may effectively travel the robot cleaner by repeating a photograph operation for sensing obstacles and confirming a position of the robot cleaner using one camera while the robot cleaner cleans a predetermined zone.

The above object of the present invention is substantially realized by providing an apparatus for controlling a camera of a robot cleaner comprising: a first axis driver 310 for driving a camera mounted at the robot cleaner in a first axis direction; a second axis driver 320 for driving the camera in a second axis direction other than the first axis direction; an image processor 330 for receiving and processing an image photographed by the camera; and a control section 340 for controlling the first axis driver and the second axis driver, and controlling a traveling of the robot cleaner based on the image photographed by the camera.

In accordance with another aspect of the present invention, there is provided a method for controlling a camera of a robot cleaner, comprising the steps of: (i) initializing a camera mounted at the robot cleaner with an origin; (ii) driving the camera in a first axis direction and photographing a first image by the camera; (iii) driving the camera in a second axis direction other than the first axis direction and photographing a second image by the camera; (iv) receiving and processing the first and second images photographed by the camera; (v) controlling a traveling of the robot cleaner based on the first and second photographed images.

In accordance with the aforementioned arrangements, by moving one camera mounted at the robot cleaner in two different axis directions and performing photographing operation using the one camera, a function of sensing obstacles and a function of detecting and compensating a position of the robot cleaner can be simultaneously embodied.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity.

Figure 1:
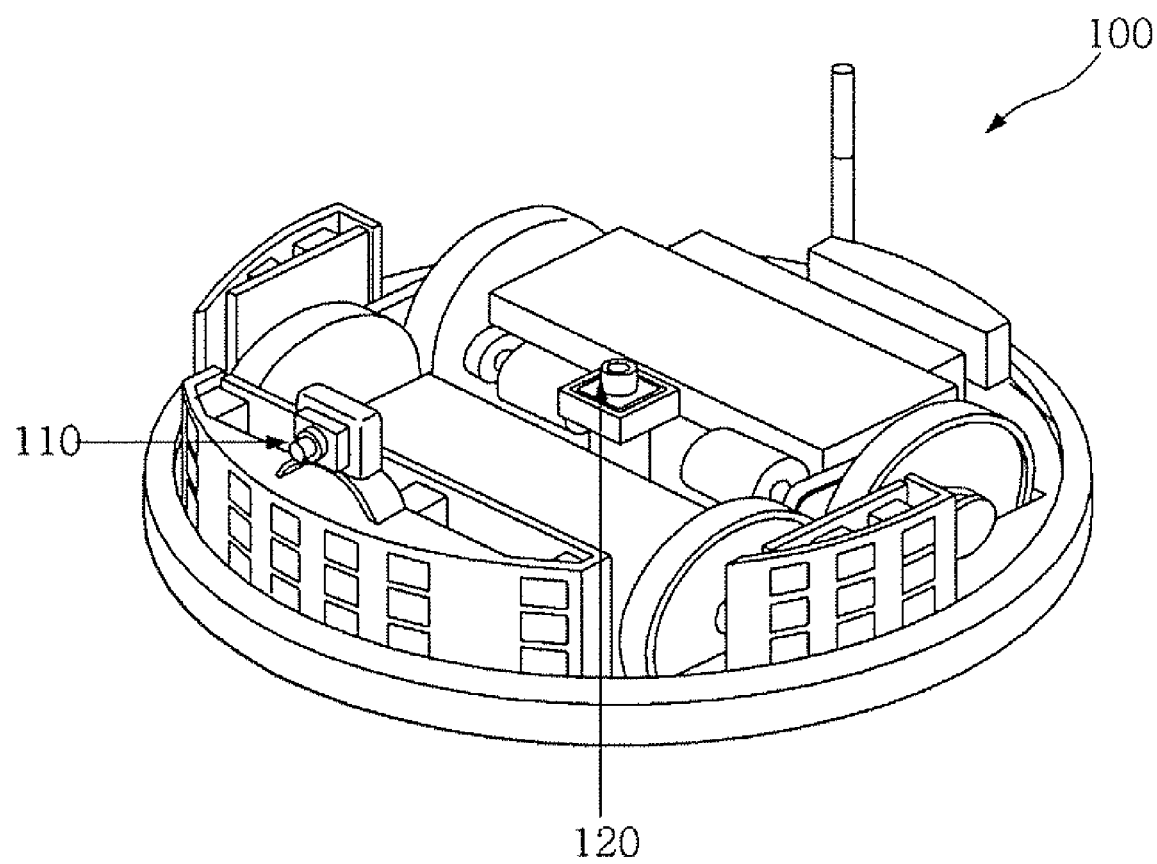
FIG. 1 is a perspective view for schematically showing a conventional robot cleaner with a camera.
Figure 2:
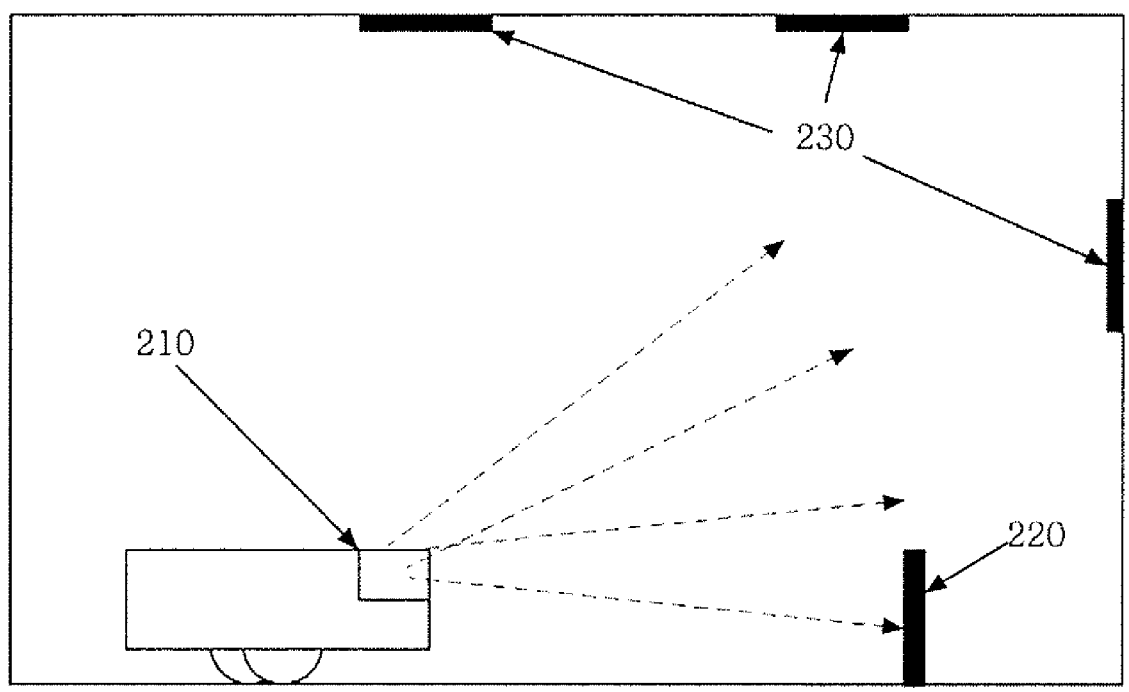
FIG. 2 is a concept view showing an operation principle of a camera mounted at a robot cleaner according to an embodiment of the present invention.

FIG. 2 is a concept view showing an operation principle of a camera mounted at a robot cleaner according to an embodiment of the present invention.

As shown in FIG. 2, a camera module mounted at the robot cleaner rotates up and down, and from side to side, to detect or avoid obstacles existing at a front direction or to detect a label installed at a ceiling or a wall in order to recognize a position of the robot cleaner. So as to do this, the camera is installed at a front upper side of the robot cleaner. The camera performs a tilting operation rotating up and down and a panning operation rotating from side to side, to photograph a subject.

The photographed images are divided and stored according to whether the images are for sensing obstacles or for detecting a label. When it is judged through an image processing that the photographed images are for sensing obstacles, the camera detects presence or absence, distance, and pattern of the obstacles. Because a technique for detecting presence or absence, distance, and pattern of the obstacles using photographed images is well known, a detailed description thereof is omitted.

On the other hand, when the photographed images are for detecting the label, the camera detects whether or not there is a corresponding label, or the label is a specific one among various kinds of labels, for example, a label indicating living room, kitchen, sitting room, or a first zone or a second zone of the living room. Because this procedure is achieved by a known image processing, a detailed explanation thereof is omitted.

Embodiment 1

Figure 3:
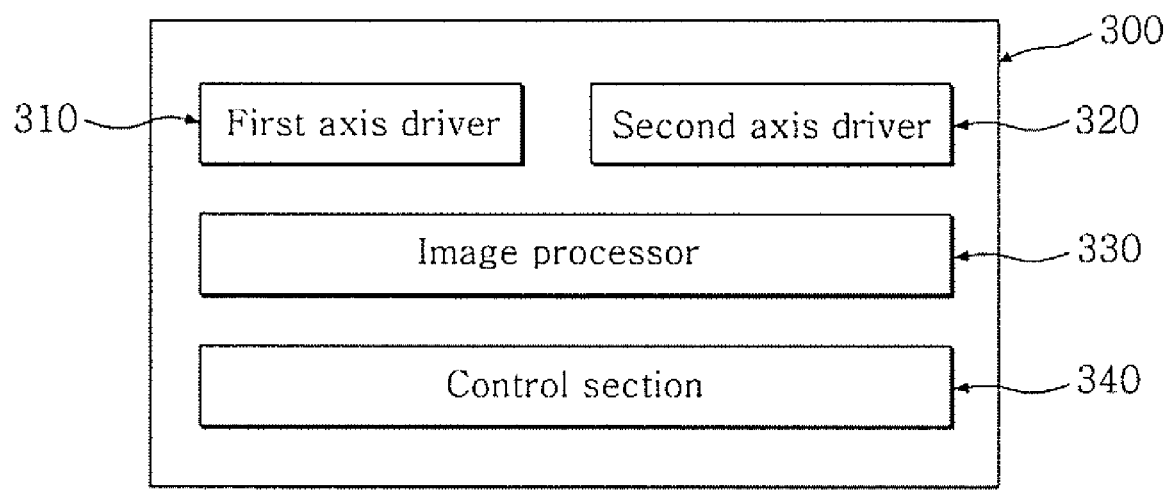
FIG. 3 is a block diagram showing a schematic construction of the robot cleaner according to an embodiment of the present invention.

FIG. 3 is a block diagram showing a schematic construction of the robot cleaner according to an embodiment of the present invention.

A first axis driver 310 rotates and moves a camera in a first axis direction. A second axis driver 320 rotates and moves the same camera in a second axis direction.

An image processor 330 separately stores a first image photographed by the camera driven by the first axis driver 310 and a second image photographed by the camera driven by the second axis driver 320 in a memory (not shown). The image processor 330 reads the photographed images to sense a presence or absence and a pattern of obstacles and to detect a specific label for confirming a position of the robot cleaner.

As a power is applied to the robot cleaner, it operates. When the robot cleaner operates, a control section 340 positions the camera at an origin. Here, the origin is an initial position of the camera. The camera can drive from the origin to the first axis direction or the second axis direction. Namely, the origin is positioned at an intersection of a first axis and a second axis. Once the camera is positioned at the origin, the control section 340 controls the first axis driver 310 or the second axis driver 320 at need during a traveling of the robot cleaner, so that it photographs front obstacles or a label installed at an upper side for compensating a position of the robot cleaner. The label is marked as a predetermined pattern or character and is made of a shape to be easily attached at a position such as a ceiling or a wall in order to distinguish a space to which the label is attached from other spaces. When a specific label is detected, the control section 340 judges whether the robot cleaner is disposed at a specific position, for example, sitting room, living room, or kitchen. In a case of a wide space, the control section 340 judges whether the robot cleaner is disposed at a specific part, for example, a first zone, a second zone, or a third zone of a living room wherein the living room is divided into three zones including the first zone, the second zone, and the third zone.

Preferably, it may be structured that the camera photographs obstacle while the first axis drive 310 rotates camera in a horizontal direction. Further, the camera photographs a label for a position detection installed at a ceiling or a wall while the second axis driver 320 rotates the camera in a vertical direction.

On the other hand, the robot clean alternately or repeatedly needs to perform a first work of sensing the obstacles and a second work of detecting and compensation a position. In order to change the first work of sensing the obstacles to the second work of detecting and compensation a position, namely, to change one work to another work, the control section 340 moves the camera to an origin and then controls a drive of another axis to change the work. For example, when the control section 340 controls the first axis driver 310 to sense the obstacles, so as to change the first work to the second work of detecting a position, while the control section 340 controls the first axis driver 310 to position the camera at the origin and then controls the second axis driver 320 to move the camera in a vertical direction, the camera photographs an image.

Furthermore, when the robot cleaner cleans a wide zone in which a plurality of obstacles are present, the first work of sensing the obstacles and the second work of detecting a position generally repeat. In this case, the control section 340 may alternately control the first axis driver 310 and the second axis driver 320 according to a predetermined program. The predetermined program is set by at least on basis and is stored in a memory area (not shown) of the robot cleaner, so that the control section 340 may access the program.

First, a program set based on the time repeats a first work of sensing the obstacles and the second work of detecting a position according to a predetermined time interval. For example, after driving, the program alternately repeats the first work of sensing the obstacles and the second work of detecting the position at one-minute intervals. Otherwise, the program can repeat a pattern in such a manner that the first work of sensing the obstacles is performed three times and the second work of detecting a position once.

On the other hand, the predetermined program can be prepared based on specific conditions or moving distance. After the robot cleaner moved by a predetermined distance, for example, 2 m every time, a first work of sensing the obstacles and the second work of detecting the position are alternately performed. Otherwise, when obstacles approach within 1 m, the second work of detecting the position is carried out.

As is seen from the forgoing description, the predetermined program can be prepared using a pattern based on the time, moving distance, or specific conditions, or simultaneously applying them according to a priority order under a control of the control section 340.

Figure 4A:
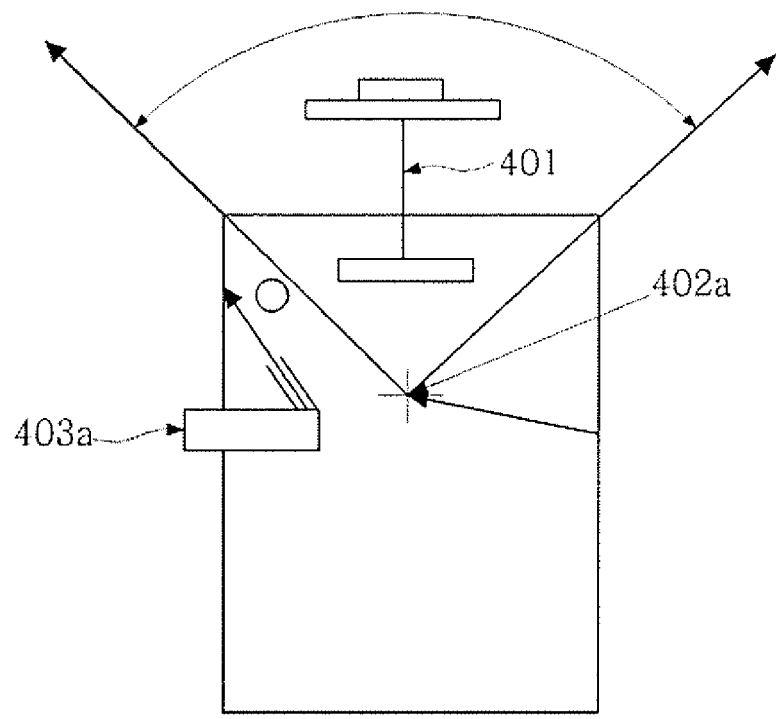
FIG. 4a is a concept view showing a schematic construction of a driver for a panning of a camera according to an embodiment of the present invention.
Figure 4B:
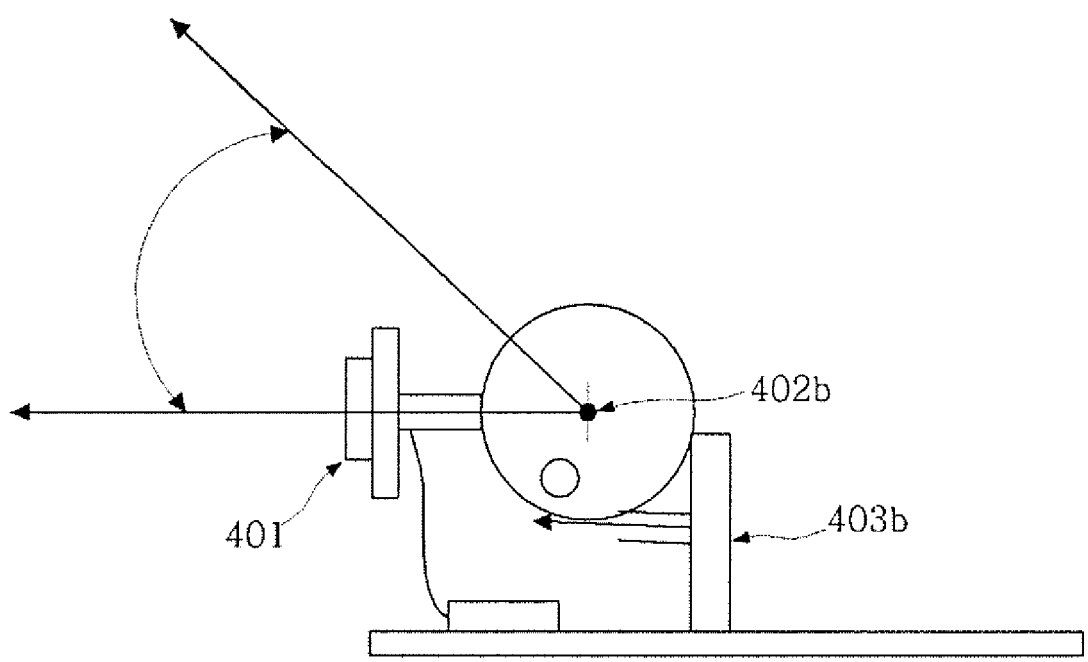
FIG. 4b is a concept view showing a schematic construction of a driver for a tilting of a camera according to an embodiment of the present invention.

FIG. 4a is a concept view showing a schematic construction of a driver for a panning of a camera according to an embodiment of the present invention. FIG. 4b is a concept view showing a schematic construction of a driver for a tilting of a camera according to an embodiment of the present invention.

The first axis driver 310 includes a camera mounting section 401, a rotating shaft 402a, a motor (not shown), and an origin sensor 403a. A camera is mounted at the camera mounting portion 401. The camera mounting portion 401 is connected to the rotating shaft 402a and rotates. The rotating shaft 402a rotates the camera mounting portion 401. The motor drives the rotating shaft 402a. The origin sensor 403a senses whether or not the camera is positioned at an origin and transfers a sensed result to the control section 340.

As a power is supplied to the robot cleaner, the robot cleaner starts to operate. When the robot cleaner starts to operate, the control section 340 supplies a power to the motor, and controls the motor to position the camera at the origin. It is preferred that a stepped motor with a precision position control function is used as the motor. The robot cleaner travels to perform a cleaning work, and performs a panning operation for sensing obstacles according to the aforementioned program. The panning operation can theoretically rotate at an angle ranging from 0 to 360 degrees. However, in order to simplify a construction, be small-sized, and reduce manufacturing cost, the panning operation preferably rotates at a predetermined angle range, for example, an angle range of approximately 0 to 120 degrees. In order to photograph an image of an area being not included in the predetermined angle, the control section 340 controls a driver of a robot cleaner body to horizontally rotate the robot cleaner itself, thereby photographing an image of a corresponding area.

On the other hand, an origin sensor 403a such as a touch sensor is provided corresponding to an origin of the camera and senses whether or not the camera is positioned at the origin. When the camera is positioned at the origin, the origin sensor 403a senses whether or not the camera is positioned at the origin through contacting and transfers a sensed result to the control section 340.

The camera photographs an image in a state positioned at a predetermined angle, or determines a photograph area according to a laser beam in the same manner as in prior art and photographs the image.

The second axis driver 320 has substantially the same construction and control method as those of the first axis driver 310. The difference is that a moving direction of the second axis driver 320 differs from that of the first axis driver 310. That is, as shown in FIG. 4b, the second axis driver 320 includes a camera mounting section 401, a rotating shaft 402b, a motor (not shown), and an origin sensor 403b. A camera is mounted at the camera mounting portion 401. The camera mounting portion 401 is connected to the rotating shaft 402b and rotates. The rotating shaft 402b rotates the camera mounting portion 401. The motor drives the rotating shaft 402b. The origin sensor 403b senses whether or not the camera is positioned at an origin and transfers a sensed result to the control section 340.

When a power is supplied to the robot cleaner, or a work for sensing obstacles changes to a work of confirming the position, the control section 340 supplies a power to the motor, and controls the motor to position the camera at the origin. It is preferred that a stepped motor with a precision position control function is used as the motor.

The robot cleaner performs a tilting operation for confirming the position of the robot cleaner according to the aforementioned program. The tilting operation can theoretically rotate at an angle ranging from 0 to 180 degrees. However, in order to simplify a construction, be small-sized, and reduce manufacturing cost, the panning operation preferably rotates at a predetermined angle, for example, an angle ranging from approximately 0 to 90 degrees. In order to photograph an image of an area being not included in the predetermined angle, the control section 340 controls a driver of a robot cleaner body to perform a rectilinear motion for the robot cleaner, namely, to forward or back a robot cleaner body, thereby photographing an image of a corresponding area.

On the other hand, an origin sensor 403a such as a touch sensor is provided corresponding to an origin of the camera and senses whether or not the camera is positioned at the origin. When the camera is positioned at the origin, the origin sensor 403a senses whether or not the camera is positioned at the origin through contacting and transfers a sensed result to the control section 340. The camera photographs an image in a state positioned at a predetermined angle, or determines a photograph area according to a laser beam in the same manner as in prior art and photographs the image.

Embodiment 2

Figure 5:
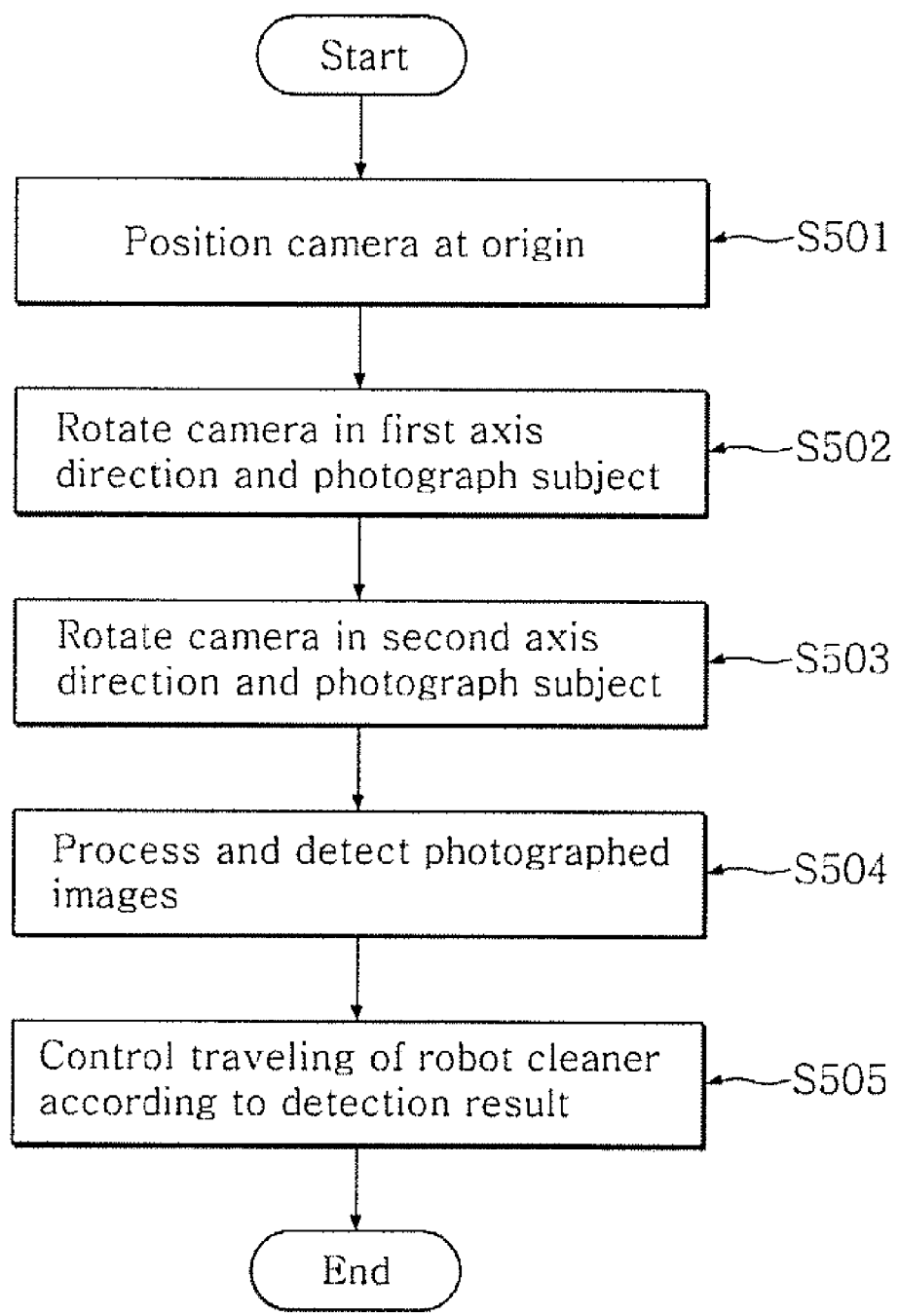
FIG. 5 is a flow chart for illustrating a method for controlling a camera according to an embodiment of the present invention.

FIG. 5 is a flow chart for illustrating a method for controlling a camera according to an embodiment of the present invention.

As shown in FIG. 5, when a power is applied to drive the robot cleaner, the control section 340 positions the camera at an origin (step S501). Here, the origin is an initial position of the camera. The camera can drive from the origin to the first axis direction or the second axis direction. Namely, the origin is positioned at an intersection of a first axis and a second axis. Once the camera is positioned at the origin, the control section 340 controls the first axis driver 310 or the second axis driver 320 at need during a traveling of the robot cleaner, so that it photographs front obstacles or a label installed at an upper side for compensating a position of the robot cleaner.

The label is marked as a predetermined pattern or character and is made of a shape to be easily attached at a position such as a ceiling or a wall in order to distinguish a space to which the label is attached from other spaces. When a specific label is detected, the control section 340 judges whether the robot cleaner is disposed at a specific position, for example, sitting room, living room, or kitchen. In a case of a wide space, the control section 340 judges whether the robot cleaner is disposed at a specific part, for example, a first zone, a second zone, or a third zone of a living room wherein the living room is divided into three zones including the first zone, the second zone, and the third zone.

Next, the camera photographs an image while the first axis drive 310 rotates camera in a first axis direction (step S502). Further, the camera photographs an image while the second axis driver 320 rotates the camera in a second axis direction (step S503). This causes the camera to obtain an image for sensing a presence and a shape of obstacles or confirming a position of the robot cleaner.

As described earlier, when a necessary image is photographed, the image processor 330 receives the images, and separately stored a first image photographed by the first axis driver 310 driven and a second image photographed by a second axis driver 320 driven in a memory (not shown). Further, the image processor 330 reads photographed images to either sense presence or absence and a shape of the obstacles, or identifies a specific label for confirming the position of the robot cleaner (step S504).

When the presence and the shape of the obstacles, or the position of the robot cleaner is confirmed, the control section 340 continues to travel or changes a traveling direction according to the confirmation result, or continues to control a traveling including a photograph of additional images if necessary (step S505).

Preferably, it can be constructed that the camera photographs obstacle while the first axis drive 310 rotates camera in a horizontal direction. Further, the camera photographs a label for a position detection installed at a ceiling or a wall while the second axis driver 320 rotates the camera in a vertical direction.

A horizontal rotation for sensing the obstacles, that is, a panning operation can theoretically rotates at an angle ranging from 0 to 360 degrees. However, in order to simplify a construction, be small-sized, and reduce manufacturing cost, the panning operation preferably rotates at a predetermined angle range, for example, an angle range of approximately 0 to 120 degrees. In order to photograph an image of an area being not included in the predetermined angle, the control section 340 controls a driver of a robot cleaner body to horizontally rotate the robot cleaner itself, thereby photographing an image of a corresponding area.

A vertical rotation for photographing a label installed at a ceiling or a wall, namely, a tilting operation can theoretically rotates at an angle ranging from 0 to 180 degrees. However, in order to simplify a construction, be small-sized, and reduce manufacturing cost, the panning operation preferably rotates at a predetermined angle, for example, an angle ranging from approximately 0 to 90 degrees. In order to photograph an image of an area being not included in the predetermined angle, the control section 340 controls a driver of a robot cleaner body to perform a rectilinear motion for the robot cleaner, namely, to forward or back a robot cleaner body, thereby photographing an image of a corresponding area.

On the other hand, the robot clean alternately or repeatedly needs to perform a first work of sensing the obstacles and a second work of detecting and compensation a position. In order to change the first work of sensing the obstacles to the second work of detecting and compensation a position, namely, to change one work to another work, the control section 340 moves the camera to an origin and then controls a drive of another axis to change the work. For example, when the control section 340 controls the first axis driver 310 to sense the obstacles, so as to change the first work to the second work of detecting a position, while the control section 340 controls the first axis driver 310 to position the camera at the origin and then controls the second axis driver 320 to move the camera in a vertical direction, the camera photographs an image. When the control section 340 changes to control from the first axis driver 310 to the second axis 320 driver or from the second axis driver 320 to the first axis driver 310, the control section 340 moves the camera to the origin.

Furthermore, when the robot cleaner cleans a wide zone in which a plurality of obstacles are present, the first work of sensing the obstacles and the second work of detecting a position generally repeat. In this case, the control section 340 may alternately control the first axis driver 310 and the second axis driver 320 according to a predetermined program. The predetermined program is set by at least on basis and is stored in a memory area (not shown) of the robot cleaner, so that the control section 340 may access the program.

First, a program set based on the time repeats a first work of sensing the obstacles and the second work of detecting a position according to a predetermined time interval. For example, after driving, the program alternately repeats the first work of sensing the obstacles and the second work of detecting the position at one minute interval. Otherwise, the program can repeat a pattern in such a manner that the first work of sensing the obstacles is performed three times and the second work of detecting a position once.

Thereafter, the predetermined program can be prepared based on specific conditions or moving distance. After the robot cleaner moved by a predetermined distance, for example, 2 m every time, a first work of sensing the obstacles and the second work of detecting the position are alternately performed. Otherwise, when obstacles approach within 1 m, the second work of detecting the position is carried out.

As is seen from the forgoing description, the predetermined program can be prepared using a pattern based on the time, moving distance, or specific conditions, or simultaneously applying them according to a priority order under a control of the control section 340.

By the aforementioned arrangement, the present invention can provide a robot cleaner of a simple construction, which photograph an ambient image by moving the one camera in two different axis directions wherein an image obtained by moving one shaft is for sensing obstacles, and an image by moving another shaft is for confirming and compensating a position of the robot cleaner.

Furthermore, the prevent invention may provide an apparatus and a method for controlling a camera of a robot cleaner, which may sense objects present at different directions by rotating one camera in horizontal and vertical directions.

In addition, as mentioned above, while the robot cleaner cleans a predetermine zone, one camera of the robot cleaner repeats to sense obstacles and confirm a position thereof. This causes the robot cleaner to effectively travel and clean entire cleaning zones.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for controlling a camera of a robot cleaner comprising:
   a first axis driver for driving a camera mounted at the robot cleaner in a horizontal direction;
   a second axis driver for driving the camera in a vertical direction;
   an image processor for receiving and processing an image photographed by the camera; and
   a control section for controlling the first axis driver and the second axis driver, and controlling a traveling of the robot cleaner based on the image photographed by the camera;
   wherein each of the first and second axis drivers includes an origin sensor for confirming whether the camera is positioned at an origin,
   wherein the origin is present at an intersection between a first axis, and a second axis, and
   wherein the control section moves the camera to the origin when the control section changes the control from the first axis driver to the second axis driver or from the second axis driver to the first axis driver.

2. The apparatus as claimed in claim 1, wherein the first axis driver rotates within a range of 120°.

3. The apparatus as claimed in claim 2, wherein the control section controls a driver of a robot cleaner body to horizontally rotate the robot cleaner itself in order to photograph an image of a region beyond the range of 120°.

4. The apparatus as claimed in claim 1, wherein the second axis driver rotates within a range of 90°.

5. The apparatus as claimed in claim 4, wherein the control section controls a driver of a robot cleaner body to perform a rectilinear motion for the robot cleaner itself in order to photograph an image of a region beyond the range of 90°.

6. The apparatus as claimed in claim 1, wherein a first image photographed by the camera driven in the first axis direction is obstacle information, and a second image photographed by the camera driven in the second axis direction is position information of the robot cleaner.

7. The apparatus as claimed in claim 1, wherein the control section alternately drives the first axis driver and the second axis driver according to a predetermined pattern.

8. The apparatus as claimed in claim 7, wherein the predetermined pattern is determined based on time, a moving distance of the robot cleaner, or a combination thereof.

9. The apparatus as claimed in claim 1, wherein the origin sensor is a touch sensor.

* * * * *